May 25, 1937. S. DE ECHAGARAY 2,081,794
APPARATUS FOR PURIFYING LIQUIDS
Filed June 25, 1935
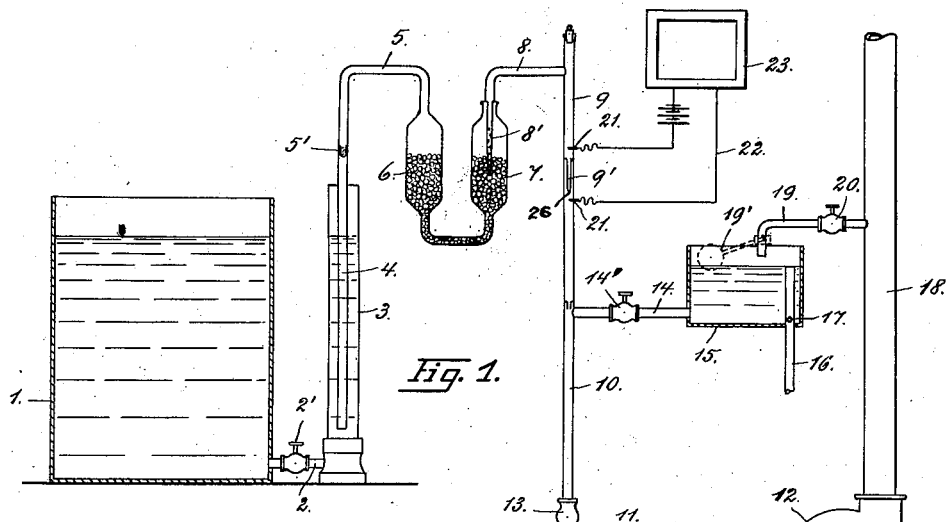
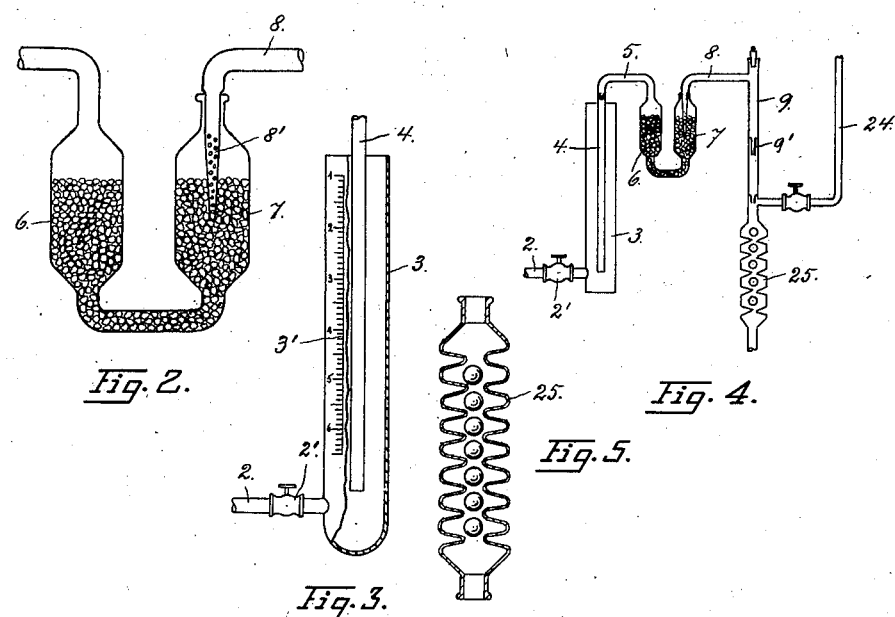
INVENTOR
Salvador de Echagaray,
by Carl A. Hellmann,
ATTORNEY.

Patented May 25, 1937

2,081,794

UNITED STATES PATENT OFFICE 2,081,794

APPARATUS FOR PURIFYING LIQUIDS

Salvador de Echagaray, Mexico City, D. F., Mexico, assignor, by direct and mesne assignments, of one-third to Alberto Mascarenas and two-thirds to Aguas Purificadas, Sociedad Anonima, Mexico City, D. F., Mexico, a company of Mexico Application June 25, 1935, Serial No. 28,351
In Mexico August 21, 1934

5 Claims. (Cl. 210—29)

The present invention relates to an apparatus for purifying liquids, and more especially to an apparatus for incorporating a relatively small quantity of a purifying or disinfecting solution into a relatively large quantity of the liquid to be purified, in order to eliminate from said liquid the live organisms contained therein.

The invention has for its object to provide means whereby a determined amount of the purifying or disinfecting solution is continuously added to a flowing liquid, and also means for controlling with ease and precision the amount of the purifying solution added.

The invention further contemplates an apparatus of the class described, made so as to perform automatically in its different applications, in order to prevent the purifying solution from being wasted, and also to impede the passage through the installation of any liquid which has not been previously mixed with the proper amount of purifying solution.

Other objects and advantages will become apparent to persons who read the following description in connection with the accompanying drawing.

It is a well known fact that typhoid fever, paratyphoid fever and several other infectious diseases are exclusively propagated through the drinking water, and that this water may be made biologically pure by the action of a convenient amount of chlorine mixed with it. The use of this substance has reduced the mortality due to these infections to a very low percentage, and almost to zero, in all the cities in which the chlorination of the water is effected by proper methods and apparatus. But the operation of chlorination is complicated and not so easy to realize in due form, and therefore many towns possessing installations for chlorination have not seen the mortality diminish, this being due either to a faulty installation or to a defective working of certain devices used.

These inconveniences are eliminated by the use of the apparatus to be described later on, as one of its principal objects consists in effecting a proper chlorination of drinking waters, although this is only one of its possible applications, as will be apparent from the specification.

In the accompanying drawing, in which two preferred embodiments of the invention are shown:

Figure 1 represents schematically an apparatus for purifying a liquid, such as drinking water, by the addition of chlorine.

Figure 2 shows, on a larger scale, the filter for the purifying solution.

Figure 3 represents the water level column used for measuring instantly the rate of consumption of the purifying solution.

Figure 4 is another schematic view of a modified form of the apparatus shown in Figure 1.

Figure 5 is a vertical sectional view of an agitator and mixer for the liquid in the apparatus shown in Figure 4.

Corresponding parts in all of the figures are designated by the same reference characters.

The schematic drawing of Figure 1 represents the application of the apparatus in a pumping station, in which the water to be purified enters a centrifugal pump and receives the purifying solution before it is drawn into the pump. In this figure, 1 is a tank containing the purifying solution, which tank communicates by a tube 2, provided with a cock 2', with a narrow vertical glass container 3, acting as a water level column, which simultaneously serves to indicate the level of the solution in the tank 1, and to measure rapidly and with great precision the rate at which the solution is being mixed with the liquid to be purified.

Into the container 3 is vertically inserted a tube 4, open at its lower end, which reaches almost to the bottom of said container, and connected at its other extremity to a tube 5 bent into the shape of an inverted U which, at the end 5' communicating with the tube 4, permits the passage of the purifying solution only through a number of small holes, so as to retain any solid particles suspended in said solution. The tube 5, at its other extremity, is connected to the filters 6 and 7, which, in the embodiment shown in the drawing, consists of a U-shaped tube enlarged along its vertical arms and partially filled with grains of sand of a suitable size. These filters serve to retain all solid impurities which have passed the holes in part 5'.

The upper extremity of the filter 7 communicates with a glass tube 8, the drawn-out end 8' of which enters into said filter and is provided with a number of holes even smaller than the holes in 5', with the object of still further impeding the passage of any small solid matters. The tube 8 is bent at a right angle and communicates with a vertical tube 9, the lower extremity of which ends in a long point 9' having a very small hole 26 at its lower end. If this hole should become obstructed, the upper end of the tube 9 may be uncovered and the obstruction removed with a thin wire inserted thereinto.

The point 9' enters into another vertical tube 10, the lower end of which passes through the wall of the suction pipe 11 of the centrifugal pump 12 and discharges the purifying solution into the water flowing through said pipe. In order to protect the apparatus against back-pressure occasioned by a sudden stopping of the pump, a check-valve 13 is provided in the tube 10, which opens by suction and closes against back-pressure.

At a certain distance below point 9' there enters into the tube 10 a horizontal pipe 14, through which passes a continuous stream of water from a tank 15, a valve 14' being provided in the pipe 14 for controlling the flow of said water. The water level in the tank 15 is kept constant by an overflow pipe 16 having a small hole 17 at a point close to the bottom of said tank. The water entering the tank 15 is taken from the discharge pipe 18 of the centrifugal pump 12, and the flow may be stopped by closing the valve 20 in the feed pipe 19. For maintaining a constant level in the tank 15, a float 19' may also be used, in which case the overflow pipe 16 and the valve 20 may be omitted.

Immediately above and below the point 9' of the tube 9 there pass through the walls of said tube and of tube 10 two platinum or silver wires 21 forming part of an electrical circuit 22 connected with a frame or casing 23, which may contain an indicator or alarm, such as an electric bell or lamp, to show immediately any interruption produced in the circuit 22 as soon as the chlorine solution stops to circulate and breaks the circuit between the wires 21. The caretaker of the purifying station is thereby automatically notified that the water in the pipe 11 is not receiving any chlorine solution, and can stop the pump until the necessary repairs are made. By making suitable connections between the circuit 22 and the motor driving the pump 12, this pump can also be automatically stopped before any water not containing chlorine has been able to pass.

Referring to the apparatus shown in Figure 1, the flow of water in the suction pipe 11 of the pump 12 determines a suction from the tube 10 entering said pipe, and this suction is continued through the tubes 9 and 8, filters 7 and 6 and tubes 5, 4 and 2 up to the storage tank 1. The water escaping from the tank 15 and entering laterally into the tube 10, produces a partial vacuum in said tube, acting as a water ejector air pump and adding its own suction to the suction of the water in pipe 11, thereby making it possible to regulate the extent of said latter suction.

When the pump is stopped by the caretaker, or through an interruption in the electrical circuit 22 connected with the motor of the pump, as described, the tank 15 ceases to receive water, and the water still contained in it escapes slowly through the hole 17, permitting air to penetrate into the tube 10, whereby the effect of suction is stopped and the admission of chlorine ceases. The float 19' operates in the same manner.

If it is desired to purify water coming directly from the city main or from an elevated tank, the apparatus shown in Figure 4 is preferably used. The water enters through the pipe 24 and actuates the device directly as an air pump upon entering into the tube 10, producing the same incorporation of the chlorine solution as described before. The water, after having received the solution, passes through a special mixing and agitating device detailed in Figure 5, which consists of an enlarged glass tube 25 having a number of deep indentations formed in its sides. Obviously, any similar agitating or mixing device may also be used.

In Figure 3 is shown the container 3 provided with a scale 3' for determining the amount of purifying solution consumed in a given time. For this purpose, the cock 2' is closed and the amount of purifying solution available to be mixed with the water is thereby reduced to the liquid left in said container. The graduated scale 3' provided on said container gives the volume of its content in cubic centimeters or cubic inches, and by measuring the time consumed for the absorption of this volume, it is possible to deduce the quantity of purifying solution being mixed with the also known quantity of water passing during the same time through the pipe 11, which permits preparing a purifying solution having a convenient percentage of chlorine or like substance.

Obviously, other forms of measuring devices, filters and agitators or mixers may be conceived, and the invention is therefore not limited to the particular forms shown and described. The main features of the invention, regardless of what may be the means for obtaining them, consist in that the two liquids are thoroughly agitated after mixing, that the amount of purifying solution consumed in a given time may be instantly measured, and that any interruption in the admission of the purifying solution stops the passage of the liquid to be purified. The agitation of the mixed liquids, either by the pump or by special mixers, permits furthermore, as in no other known process, reducing the quantity of purifying solution added to a minimum, without reducing materially its instantaneous action.

What I claim is:

1. Apparatus for purifying liquids, comprising, in combination, a pump for displacing the liquid to be purified, a tank containing a purifying solution, a liquid container and means placing it in communication with said tank, a tube descending into said container, a filter connected in series with said tube, a solution discharge pipe connecting said filter with the intake side of said pump, a separate tank and means for feeding thereto liquid taken from the discharge side of said pump, means for maintaining a constant level in said separate tank, hydro-dynamic means operated by liquid escaping from said last-named tank for creating a partial vacuum in the solution discharge pipe and for thus drawing said solution into the intake side of said pump, and electrical indicating means maintained inoperative by the flow of solution in said discharge pipe for giving an indication upon cessation of such flow.

2. Apparatus for purifying liquids, comprising, in combination, a pump for displacing the liquid to be purified, a tank containing a purifying solution, a liquid container having graduations thereon, cooperating with the level of liquid therein, and means placing it in communication with said tank, a tube descending into said container, a filter connected in series with said tube, a solution discharge pipe connecting said filter with the intake side of said pump, the graduations thus serving to indicate the rate of flow of said solution, a separate tank and means for feeding thereto liquid taken from the discharge side of said pump, means for maintaining a constant level in said separate tank, hydro-dynamic means operated by liquid escaping from said last-named tank for creating a partial vacuum in the solution discharge pipe and for thus drawing said solution into the intake side of said pump, and electrical indicating means maintained inoperative by the flow of solution in said discharge pipe for giving an indication upon cessation of such flow.

3. Apparatus for purifying liquids, comprising, in combination, a pump for displacing the liquid to be purified, a tank containing a purifying solution, a liquid container and means placing it in communication with said tank, a tube descending into said container, a U-tube connected in series with said tube, each arm of said U-tube containing filter material and thus constituting a filter, a solution discharge pipe connecting said filter with the intake side of said pump, a separate tank and means for feeding thereto liquid taken from the discharge side of said pump, means for maintaining a constant level in said separate tank, hydro-dynamic means operated by liquid escaping from said last-named tank for creating a partial vacuum in the solution discharge pipe and for thus drawing said solution into the intake side of said pump, and electrical indicating means maintained inoperative by the flow of solution in said discharge pipe for giving an indication upon cessation of such flow.

4. Apparatus for purifying liquids, comprising, in combination, a pump for displacing the liquid to be purified, a tank containing a purifying solution, a liquid container and means placing it in communication with said tank, a tube descending into said container, a filter connected in series with said tube, a solution discharge pipe connecting said filter with the intake side of said pump, a separate tank and means for feeding thereto liquid taken from the discharge side of said pump, means for maintaining a constant level in said separate tank, hydro-dynamic means operated by liquid escaping from said last-named tank for creating a partial vacuum in the solution discharge pipe and for thus drawing said solution into the intake side of said pump, and electrical indicating means comprising electrodes contacting with the flow of purifying solution, whereupon cessation of flow in said discharge pipe will interrupt the electrical connection between such electrodes whereby the indicating means will give an indication upon cessation of such flow.

5. Apparatus for purifying liquids, comprising, in combination, a pump for displacing the liquid to be purified, a tank containing a purifying solution, a liquid container and means placing it in communication with said tank, a tube descending into said container, a filter connected in series with said tube, a solution discharge pipe connecting said filter with the intake side of said pump, a separate tank and means for feeding thereto liquid taken from the discharge side of said pump, means for maintaining a constant level in said separate tank, hydro-dynamic means operated by liquid escaping from said last-named tank for creating a partial vacuum in the solution discharge pipe and for thus drawing said solution into the intake side of said pump, whereby said pump will cause thorough agitation and mixing of the purifying solution with the liquid to be purified.

SALVADOR DE ECHAGARAY.